(12) United States Patent
Miyamoto et al.

(10) Patent No.: US 9,988,534 B2
(45) Date of Patent: Jun. 5, 2018

(54) POLYIMIDE PRECURSOR COMPOSITION AND METHOD FOR PRODUCING POLYIMIDE PRECURSOR COMPOSITION

(71) Applicant: FUJI XEROX CO., LTD., Tokyo (JP)

(72) Inventors: Tsuyoshi Miyamoto, Kanagawa (JP); Tomoya Sasaki, Kanagawa (JP); Kana Miyazaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days. days.

(21) Appl. No.: 15/243,030

(22) Filed: Aug. 22, 2016

(65) Prior Publication Data

US 2017/0240743 A1 Aug. 24, 2017

(30) Foreign Application Priority Data

Feb. 22, 2016 (JP) ................. 2016-031035

(51) Int. Cl.
*C08L 79/08* (2006.01)
(52) U.S. Cl.
CPC .................. *C08L 79/08* (2013.01)
(58) Field of Classification Search
USPC ...................................... 528/289; 428/473.5
See application file for complete search history.

(56) References Cited

U.S. PATENT DOCUMENTS

| | | | |
|---|---|---|---|
| 4,238,528 A | 12/1980 | Angelo et al. | |
| 5,466,732 A | 11/1995 | Tomioka et al. | |
| 5,907,005 A | 5/1999 | Shimizu | |
| 6,399,669 B1 * | 6/2002 | Suzuki | C08J 9/28 521/183 |
| 2009/0194737 A1 | 8/2009 | Lai et al. | |
| 2010/0207293 A1 | 8/2010 | Nakayama et al. | |
| 2011/0059305 A1 * | 3/2011 | Kaneya | C08G 73/1039 428/220 |
| 2013/0053513 A1 | 2/2013 | Tsai | |
| 2013/0230724 A1 * | 9/2013 | Miyamoto | G03G 15/0189 428/411.1 |
| 2014/0137735 A1 * | 5/2014 | Bhandari | B01D 69/02 95/47 |

FOREIGN PATENT DOCUMENTS

| | | | |
|---|---|---|---|
| JP | H04-081167 | B2 | 12/1992 |
| JP | H06-1915 | A | 1/1994 |
| JP | H06-293834 | A | 10/1994 |
| JP | H07-310048 | A | 11/1995 |
| JP | H07-324163 | A | 12/1995 |
| JP | H08-165346 | A | 6/1996 |
| JP | H10-81749 | A | 3/1998 |
| JP | H10-195295 | A | 7/1998 |
| JP | H10-204437 | A | 8/1998 |
| JP | 2003-074587 | A | 3/2003 |
| JP | 2009-037222 | A | 2/2009 |
| JP | 2009-091573 | A | 4/2009 |
| JP | 2010-168517 | A | 8/2010 |
| JP | 2011-043801 | A | 3/2011 |
| JP | 2013-101303 | A | 5/2013 |
| JP | 2013-101304 | A | 5/2013 |
| JP | 2013-127597 | A | 6/2013 |
| JP | 2014-063133 | A | 4/2014 |
| WO | 03/074587 | A1 | 9/2003 |

OTHER PUBLICATIONS

Jan. 18, 2017 Office Action Issued in U.S. Appl. No. 15/008,586.
Sci-Finder information sheet for butylactone and cyclohexanone, p. 1-2, 2017.
U.S. Appl. No. 15/008,586, filed Jan. 28, 2016 in the name of Miyamoto et al.
Jun. 7, 2017 Office Action Issued in U.S. Appl. No. 15/008,586.

* cited by examiner

*Primary Examiner* — Tae H Yoon
(74) *Attorney, Agent, or Firm* — Oliff PLC

(57) ABSTRACT

A polyimide precursor composition includes a solvent mixture containing an alcohol solvent and a water-insoluble solvent that is at least one selected from the solvent group consisting of water-insoluble ketones and water-insoluble ethers; and a polyimide precursor dissolved in the solvent mixture.

8 Claims, No Drawings

POLYIMIDE PRECURSOR COMPOSITION AND METHOD FOR PRODUCING POLYIMIDE PRECURSOR COMPOSITION

CROSS-REFERENCE TO RELATED APPLICATIONS

This application is based on and claims priority under 35 USC 119 from Japanese Patent Application No. 2016-031035 filed Feb. 22, 2016.

BACKGROUND (i) Technical Field

The present invention relates to a polyimide precursor composition and a method for producing a polyimide precursor composition.

(ii) Related Art

Polyimide resins, which have high durability and high heat resistance, are widely used in various applications, for example, electronic materials for insulating layers and flexible substrates for forming electronic circuits, components, and transfer belts and fixing belts of electrophotographic apparatuses.

Such polyimide resins, which are difficult to soften by heating, are not easy to shape through melting. In addition, polyimide resins, which are difficult to dissolve in solvents, are not easy to shape by preparing, applying, and drying solutions of polyimide resins. For these reasons, shaping of polyimide resins is performed by preparing polyimide precursor compositions containing polyimide precursors (polyamic acids) dissolved in solvents, and subjecting the polyimide precursor compositions to drying and imidization by heat treatment. However, there are only a limited number of solvents that dissolve polyimide precursors.

As solvents that dissolve polyimide precursors and have lower boiling points than ordinary aprotic polar solvents, solvent mixtures are used that each contain at least one of a water-soluble ether and a water-soluble ketone as a main solvent and further contain a water-soluble alcohol or water.

SUMMARY

According to an aspect of the invention, there is provided a polyimide precursor composition including a solvent mixture containing an alcohol solvent and a water-insoluble solvent that is at least one selected from the solvent group consisting of water-insoluble ketones and water-insoluble ethers; and a polyimide precursor dissolved in the solvent mixture.

DETAILED DESCRIPTION

Hereinafter, a polyimide precursor composition and a method for producing the polyimide precursor composition according to exemplary embodiments of the invention will be described in detail.

Polyimide Precursor Composition

A polyimide precursor composition according to an exemplary embodiment includes a polyimide precursor dissolved in a solvent mixture. This solvent mixture contains an alcohol solvent B and a water-insoluble solvent A that is at least one selected from the solvent group consisting of water-insoluble ketones and water-insoluble ethers.

The term "water-insoluble" means that solubility in 100 g of water at 23° C. is less than 20 g.

According to the exemplary embodiment, the polyimide precursor is dissolved in such a solvent mixture, to thereby suppress formation of a pattern of unevenness (surface unevenness) on the surface of a shaped article formed of the polyimide resin.

The probable mechanism of providing this effect, which is not fully understood, is as follows.

Polyimide resins, which are difficult to soften by heating, are not easy to shape through melting, unlike thermoplastic resins such as polypropylene. In addition, polyimide resins, which are difficult to dissolve in solvents, are not easy to shape by preparing, applying, and drying solutions of polyimide resins. For these reasons, shaping of polyimide resins is performed by preparing polyimide precursor compositions containing polyimide precursors (polyamic acids) dissolved in solvents, and subjecting the polyimide precursor compositions to drying and imidization (turning polyimide precursors into polyimides) by heat treatment. However, there are only a limited number of solvents that dissolve polyimide precursors. For example, aprotic polar solvents such as N-methyl-2-pyrrolidone (NMP) are used.

However, in general, aprotic polar solvents such as NMP have high boiling points. Accordingly, high energy is used to remove solvents during production of polyimide shaped articles.

For this reason, as solvents that dissolve polyimide precursors (polyamic acids) and have lower boiling points than ordinary aprotic polar solvents, solvent mixtures are used that each contain at least one of a water-soluble ether and a water-soluble ketone as a main solvent, and further contain a water-soluble alcohol or water.

However, when a composition including a polyimide precursor dissolved in such a solvent mixture containing at least one of a water-soluble ether and a water-soluble ketone as a main solvent is used to produce a shaped article, a pattern of unevenness is sometimes visually detected on the surface of the shaped article (surface unevenness).

This surface unevenness is probably generated by adsorption of moisture onto the polyimide precursor composition. Specifically, during coating with the polyimide precursor composition, the water-soluble ether or water-soluble ketone in the solvent mixture causes the surface of the resultant coating to adsorb moisture, where precipitation of the polyimide precursor occurs. As a result of this precipitation, the coating has different solvent concentrations depending on regions (for example, the surface and the inside). When this coating is burned, the resultant shaped article has different degrees of aggregation or different degrees of polymerization depending on regions. This probably results in generation of a pattern of unevenness that is visually detected even on the surface of the shaped article (surface unevenness).

In contrast, the polyimide precursor composition according to the exemplary embodiment includes, as a solvent mixture dissolving the polyimide precursor, an alcohol solvent B and a water-insoluble solvent A that is at least one selected from the solvent group consisting of water-insoluble ketones and water-insoluble ethers.

The polyimide precursor exhibits very low solubility in each of the water-insoluble solvent A and the alcohol solvents B, which are individually known as poor solvents. However, it has been found that a solvent mixture of the water-insoluble solvent A and the alcohol solvent B sufficiently dissolves the polyimide precursor.

The water-insoluble solvent A has low miscibility with water, to thereby suppress adsorption of moisture onto the surface of the coating of the polyimide precursor composition. This probably results in suppression of precipitation of the polyimide precursor, reduction of the differences in the degree of aggregation and degree of polymerization depending on regions after burning, and suppression of surface unevenness on the surface of the shaped article.

Since adsorption of moisture onto the surface of the coating of the polyimide precursor composition is thus suppressed, surface blushing of the coating due to adsorption of moisture is suppressed, and deformation of the coating (for example, a change in the thickness of the coating film) may be further suppressed. As a result, deterioration of the quality of the resultant polyimide shaped article is suppressed.

When moisture is adsorbed onto the coating, the adsorbed moisture evaporates out of the coating by causing it to rip, which may result in generation of film defects such as voids. In contrast, in the exemplary embodiment, adsorption of moisture onto the surface of the coating is suppressed, so that generation of film defects such as voids is also suppressed.

The water-insoluble solvent A has low miscibility with water, so that the polyimide precursor composition according to the exemplary embodiment is less likely to absorb moisture in the atmosphere of the working environment. For example, during transfer of the polyimide precursor composition to a container, absorption of moisture in the air is suppressed. Thus, solution characteristics such as viscosity tend not to change, which provides enhanced coating stability.

The polyimide precursor composition including the solvent mixture according to the exemplary embodiment also has high fluidity. Accordingly, when the polyimide precursor composition is applied (for example, application to a base member having a curved surface such as a cylindrical mold), for example, occurrence of sagging on the surface of the base member and cissing due to flowing and aggregation are suppressed. Thus, a polyimide shaped article having high uniformity is obtained.

In the polyimide precursor composition according to the exemplary embodiment, the solvent mixture may further contain an aprotic polar solvent C.

In general, the boiling point of the aprotic polar solvent C is higher than the boiling points of the water-insoluble solvent A and the alcohol solvent B; during shaping of the polyimide precursor composition by heating, the water-insoluble solvent A and the alcohol solvent B, which have lower boiling points, evaporate earlier at lower temperatures. Even after the water-insoluble solvent A and the alcohol solvent B have evaporated, the aprotic polar solvent C, which has a higher boiling point, still remains in the polyimide precursor, so that precipitation of the resin is further suppressed. As a result, the differences in the degree of aggregation and degree of polymerization depending on regions after burning are further reduced, so that generation of surface unevenness on the surface of the shaped article is further suppressed.

Film defects such as voids generated by the water-insoluble solvent A and alcohol solvent B evaporating out of the coating by causing it to rip, are probably eliminated because the aprotic polar solvent C remaining in the coating dissolves the polyimide precursor. Thus, generation of film defects such as voids is suppressed, so that high film formability is provided.

Compared with a polyimide precursor composition using, as the solvent, a solvent constituted only by the aprotic polar solvent C, the polyimide precursor composition according to the exemplary embodiment in which the solvent is partially substituted with the water-insoluble solvent A and the alcohol solvent B, is shapable with lower energy.

Hereinafter, components of the polyimide precursor composition according to the exemplary embodiment will be described in detail.

Solvent Mixture

The polyimide precursor composition according to the exemplary embodiment contains, as a solvent dissolving the polyimide precursor, a solvent mixture containing an alcohol solvent B and a water-insoluble solvent A that is at least one selected from the solvent group consisting of water-insoluble ketones and water-insoluble ethers.

Water-Insoluble Solvent A

The water-insoluble ketones and water-insoluble ethers classified in the water-insoluble solvent A are solvents that have solubilities of less than 20 g in 100 g of water at 23° C. and that are in the liquid state at room temperature (23° C.) Incidentally, the solubility of the water-insoluble ketones and water-insoluble ethers in 100 g of water at 23° C. is preferably 15 g or less, more preferably 10 g or less.

The water-insoluble ketones and water-insoluble ethers preferably have boiling points of 200° C. or less. The boiling points of 200° C. or less, which are lower than those of ordinary aprotic polar solvents, enable reduction in the energy for removing the solvents during production of polyimide shaped articles, compared with the case of using, as the solvent dissolving the polyimide precursor, such an aprotic polar solvent alone.

The water-insoluble ketones and water-insoluble ethers preferably have boiling points of 100° C. or more. The boiling points of 100° C. or more are higher than those of ordinary water-soluble ketones and water-soluble ethers. In addition, when the boiling points are 100° C. or more, an excessive decrease in the viscosity of the composition during application of the polyimide precursor is suppressed and high formability of the coating is provided.

Examples of the water-insoluble ketones include cyclohexanone (CH, boiling point: 156° C.), methyl isobutyl ketone (MIBK, boiling point: 118° C.), diisobutyl ketone (DIBK, boiling point: 168° C.), methylcyclohexanone (MCH, (for example, 2-methylcyclohexanone, boiling point: 162° C.)), methylcyclohexanone (MCHN, (for example, 3-methylcyclohexanone, boiling point: 170° C.)), methylcyclohexanone (MCH, (for example, 4-methylcyclohexanone, boiling point: 170° C.)), methyl ethyl ketone (MEK, boiling point: 80° C.), and isophorone (IP, boiling point: 215° C.)

Examples of the water-insoluble ethers include methyltetrahydrofuran (MTHF, boiling point: 80° C.), cyclopentyl methyl ether (CPME, boiling point: 106° C.), and methyl-tert-butyl ether (MTBE, boiling point: 55° C.)

Of these, the water-insoluble solvent A is preferably cyclohexanone, methyl ethyl ketone, isophorone, and methyltetrahydrofuran, more preferably cyclohexanone.

Alcohol Solvent B

The term "alcohol solvent" denotes an alcohol that is in the liquid state at room temperature (23° C.).

The alcohol solvent B preferably has a boiling point of 200° C. or less. The boiling point of 200° C. or less, which is lower than the boiling points of ordinary aprotic polar solvents, enables reduction in the energy for removing the solvent during production of polyimide shaped articles, compared with the case of using, as the solvent dissolving the polyimide precursor, such an aprotic polar solvent alone.

The alcohol solvent B preferably has a boiling point of 100° C. or more. The boiling point of 100° C. or more is higher than the boiling points of ordinary water-soluble ketones and water-soluble ethers. When the boiling point is 100° C. or more, an excessive decrease in the viscosity of the composition during application of the polyimide precursor is suppressed, and high formability of the coating is provided.

Examples of the alcohol solvent B include aliphatic linear monohydric alcohol compounds such as methanol, ethanol, isopropyl alcohol, n-propanol, n-butanol, isobutanol, and tert-butanol; aliphatic cyclic monohydric alcohol compounds such as cyclohexanol, cyclopentanol, and cyclobutanol; polyhydric alcohols such as ethylene glycol, propylene glycol, and glycerol; ethylene glycol ethers such as ethyl cellosolve and butyl cellosolve; and propylene glycol ethers such as methylpropylene glycol.

Of these, the alcohol solvent B is preferably isopropyl alcohol, n-propanol, and ethylene glycol, more preferably ethylene glycol.

Content Ratio by Mass (A:B)

The mass ratio (A:B) of the content of the water-insoluble solvent A to the content of the alcohol solvent B in the solvent mixture is preferably 95:5 to 50:50 (19:1 to 1:1) or about 19:1 to about 1:1, more preferably 95:5 to 60:40, still more preferably 90:10 to 70:30.

When the ratio of the water-insoluble solvent A to the alcohol solvent B satisfies such a range, the polyimide precursor exhibits higher solubility in the solvent mixture.

Aprotic Polar Solvent C

In the polyimide precursor composition according to the exemplary embodiment, the solvent mixture may contain, in addition to the water-insoluble solvent A and the alcohol solvent B, an aprotic polar solvent C.

In general, the aprotic polar solvent has a boiling point of more than 200° C. and a dipole moment of 3.0 D or more and 5.0 D or less.

Examples of the aprotic polar solvent C include N-methyl-2-pyrrolidone (NMP, boiling point: 202° C.), N-ethyl-2-pyrrolidone (NEP, boiling point: 218° C.), 1,3-dimethyl-2-imidazolidinone (DMI, boiling point: 220° C.), 3-methoxy-N,N-dimethylpropanamide (MDBPA, boiling point: 215° C.), 3-methoxy-N,N-dibutylpropanamide (MDBPA, boiling point: 252° C.), γ-butyrolactone (γ-BL, boiling point: 202° C.), γ-valerolactone (γ-VL, boiling point: 207° C.), δ-valerolactone (δ-VL, boiling point: 230° C.), and ε-caprolactone (ε-Cl, boiling point: 237° C.)

Of these, the aprotic polar solvent C is preferably N-methyl-2-pyrrolidone, 1,3-dimethyl-2-imidazolidinone, 3-methoxy-N,N-dimethylpropanamide, 3-methoxy-N,N-dibutylpropanamide, and γ-butyrolactone, more preferably N-methyl-2-pyrrolidone.

Content Ratio by Mass (A+B:C)

The mass ratio (A+B:C) of the total content of the water-insoluble solvent A and the alcohol solvent B to the content of the aprotic polar solvent C in the solvent mixture is preferably 100:10 to 100:50 (10:1 to 2:1) or about 10:1 to about 2:1, more preferably 100:10 to 100:40, still more preferably 100:10 to 100:30.

When this ratio regarding the water-insoluble solvent A, the alcohol solvent B, and the aprotic polar solvent C satisfies such a range, generation of surface unevenness on the surface of the shaped article to be produced is further suppressed.

Incidentally, in the exemplary embodiment, the total content of the water-insoluble solvent A, the alcohol solvent B, and the aprotic polar solvent C in the solvent mixture is preferably 80 mass % or more, more preferably 90 mass % or more, still more preferably 95 mass %.

Polyimide Precursor

The polyimide precursor is, for example, a resin (polyamic acid) having a repeating unit represented by a general formula (I).

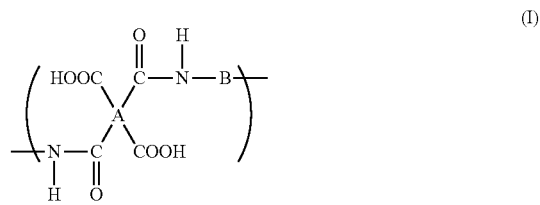

In the general formula (I), A represents a tetravalent organic group, and B represents a divalent organic group.

In the general formula (I), the tetravalent organic group represented by A is a residue of a tetracarboxylic dianhydride as a starting material, the residue being other than the four carboxyl groups.

On the other hand, the divalent organic group represented by B is a residue of a diamine compound as a starting material, the residue being other than the two amino groups.

In other words, the polyimide precursor having the repeating unit represented by the general formula (I) is a polymer of a tetracarboxylic dianhydride and a diamine compound.

The tetracarboxylic dianhydride may be an aromatic compound or an aliphatic compound, and is preferably an aromatic compound. In other words, in the general formula (I), the tetravalent organic group represented by A is preferably an aromatic organic group.

Examples of the aromatic tetracarboxylic dianhydride include pyromellitic dianhydride (PMDA), 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenyl ether tetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride (BPDA), 2,3,3',4'-biphenyltetracarboxylic dianhydride, bis(phthalic) phenylphosphine oxide dianhydride, p-phenylene-bis(triphenylphthalic) dianhydride, m-phenylene-bis(triphenylphthalic) dianhydride, bis(triphenylphthalic)-4,4'-diphenyl ether dianhydride, and bis(triphenylphthalic)-4,4'-diphenylmethane dianhydride.

Examples of the aliphatic tetracarboxylic dianhydride include aliphatic or alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 5-(2,5-dioxotetrahydrofuryl)-3-methyl-3-cyclohexene-1,2-dicarboxylic dianhydride, and bicyclo[2,2,2]-oct-7-ene-2,3,5,6-tetracarboxylic dianhydride; and aromatic-ring-containing aliphatic tetracarboxylic dianhydrides such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Of these, the tetracarboxylic dianhydride is preferably selected from aromatic tetracarboxylic dianhydrides. Specifically, preferred examples include pyromellitic dianhydride, 3,3',4,4'-biphenyltetracarboxylic dianhydride, 2,3,3',4'-biphenyltetracarboxylic dianhydride, 3,3',4,4'-biphenyl ether tetracarboxylic dianhydride, and 3,3',4,4'-benzophenonetetracarboxylic dianhydride; more preferred examples include pyromellitic dianhydride, 3,3',4,4'-biphenyltetracarboxylic dianhydride, and 3,3',4,4'-benzophenonetetracarboxylic dianhydride; and particularly preferred examples include 3,3',4,4'-biphenyltetracarboxylic dianhydride.

Such tetracarboxylic dianhydrides may be used alone or in combination of two or more thereof.

When two or more tetracarboxylic dianhydrides are used in combination, aromatic tetracarboxylic dianhydrides or aliphatic tetracarboxylic dianhydrides may be used in combination; or at least one aromatic tetracarboxylic dianhydride and at least one aliphatic tetracarboxylic dianhydride may be used in combination.

On the other hand, the diamine compound has two amino groups in the molecular structure. The diamine compound may be an aromatic or aliphatic compound, and is preferably an aromatic compound. In other words, in the general formula (I), the divalent organic group represented by B is preferably an aromatic organic group.

Examples of the diamine compound include aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindan, 6-amino-1-(4'-aminophenyl)-1,3,3-trimethylindan, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines that each have two amino groups bonded to an aromatic ring or aromatic rings and also have a hetero atom in addition to the nitrogen atoms of the amino groups, such as diaminotetraphenylthiophene; and aliphatic diamines and alicyclic diamines such as 1,1-m-xylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,0$^{2,7}$]-undecylenedimethyldiamine, and 4,4'-methylenebis(cyclohexylamine).

Of these, the diamine compound is preferably selected from aromatic diamine compounds. Specifically, preferred examples include p-phenylenediamine, m-phenylenediamine, 4,4'-diaminodiphenylmethane, 4,4'-diaminodiphenyl ether, 3,4'-diaminodiphenyl ether, 4,4'-diaminodiphenylsulfide, and 4,4'-diaminodiphenylsulfone; and particularly preferred examples include 4,4'-diaminodiphenyl ether and p-phenylenediamine.

Incidentally, such diamine compounds may be used alone or in combination of two or more thereof. When two or more diamine compounds are used in combination, aromatic diamine compounds or aliphatic diamine compounds may be used in combination; or at least one aromatic diamine compound and at least one aliphatic diamine compound may be used in combination.

The polyimide precursor may be a resin that is partially imidized (turned into imide).

Specifically, the polyimide precursor is, for example, a resin having repeating units represented by a general formula (I-1), a general formula (I-2), and a general formula (I-3).

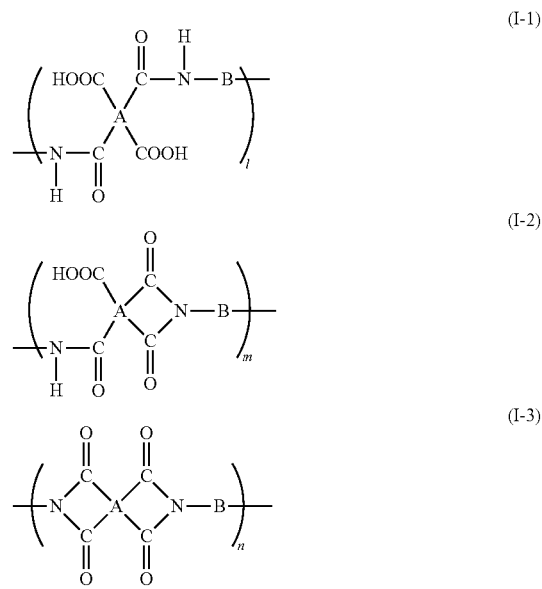

In the general formula (I-1), the general formula (I-2), and the general formula (I-3), A represents a tetravalent organic group, and B represents a divalent organic group. Incidentally, A and B have the same definitions as A and B in the general formula (I).

In the general formulae, l represents an integer of 1 or more; m and n each independently represent 0 or an integer of 1 or more; and l, m, and n satisfy the relationship of $(2n+m)/(2l+2m+2n) \leq 0.2$.

In the general formulae (I-1) to (I-3), l represents an integer of 1 or more, desirably an integer of 1 or more and 200 or less, more desirably an integer of 1 or more and 100 or less; and m and n each independently represent 0 or an integer of 1 or more, desirably each independently represent 0 or an integer of 1 or more and 200 or less, more desirably 0 or an integer of 1 or more and 100 or less.

In the general formulae (I-1) to (I-3), l, m, and n satisfy the relationship of $(2n+m)/(2l+2m+2n) \leq 0.2$, desirably the relationship of $(2n+m)/(2l+2m+2n) \leq 0.15$, more desirably $(2n+m)/(2l+2m+2n) \leq 0.10$.

The expression "$(2n+m)/(2l+2m+2n)$" denotes a ratio of, in bond portions of the polyimide precursor (reaction portions of the tetracarboxylic dianhydride and the diamine compound), the number of the imide-closed-ring bond portions (2n+m) to the number of the total bond portions (2l+2m+2n). In other words, the expression "(2n+m)/(2l+2m+2n)" denotes the imidization ratio of the polyimide precursor.

The imidization ratio (value of "(2n+m)/(2l+2m+2n)") of the polyimide precursor is set to 0.2 or less (desirably 0.15 or less, more desirably 0.10 or less), so that gelation and separation (due to precipitation) of the polyimide precursor are suppressed.

The imidization ratio of the polyimide precursor (value of "(2n+m)/(2l+2m+2n)") is measured in the following manner.

Measurement of Imidization Ratio of Polyimide Precursor
Preparation of Polyimide Precursor Sample (i) A polyimide precursor composition to be measured is applied to a silicon wafer so as to provide a coating-film sample having a thickness of 1 μm or more and 10 μm or less.

(ii) The coating-film sample is immersed in tetrahydrofuran (THF) for 20 minutes, so that the solvent in the coating-film sample is replaced by tetrahydrofuran (THF). However, the solvent used for this immersion is not limited to THF and may be selected from solvents that do not dissolve the polyimide precursor and are miscible with the solvent components in the polyimide precursor composition. Specific examples of such solvents include alcohol solvents such as methanol and ethanol and ether compounds such as dioxane.

(iii) The coating-film sample is withdrawn from THF and THF adhering to the surface of the coating-film sample is blown off with $N_2$ gas. The coating-film sample is dried for 12 hours or more under a reduced pressure of 10 mmHg or less in a temperature range of 5° C. or more and 25° C. or less. Thus, a polyimide precursor sample is prepared.

Preparation of 100%-Imidized Standard Sample (iv) As in (i) above, the polyimide precursor composition to be measured is applied to a silicon wafer, to thereby prepare a coating-film sample.

(v) The coating-film sample is heated at 380° C. for 60 minutes to cause an imidization reaction. Thus, a 100%-imidized standard sample is prepared.

Measurement and Analysis (vi) A Fourier transform infrared spectrometer (FT-730 manufactured by HORIBA, Ltd.) is used to measure the infrared absorption spectra of the 100%-imidized standard sample and the polyimide precursor sample. Regarding the 100%-imidized standard sample, a ratio I'(100) of the absorption peak derived from imide bonds at or around 1780 $cm^{-1}$ (Ab' (1780 $cm^{-1}$)) to the absorption peak derived from aromatic rings at or around 1500 $cm^{-1}$ (Ab' (1500 $cm^{-1}$)) is determined.

(vii) Similarly, the polyimide precursor sample is measured; and a ratio I(x) of the absorption peak derived from imide bonds at or around 1780 $cm^{-1}$ (Ab (1780 $cm^{-1}$)) to the absorption peak derived from aromatic rings at or around 1500 $cm^{-1}$ (Ab (1500 $cm^{-1}$)) is determined.

The determined absorption peak ratios I'(100) and I(x) are used to calculate the imidization ratio of the polyimide precursor by the following equations.

$$\text{imidization ratio of polyimide precursor} = I(x)/I'(100) \qquad \text{Equation:}$$

$$I'(100) = (Ab'(1780\ cm^{-1}))/(Ab'(1500\ cm^{-1})) \qquad \text{Equation:}$$

$$I(x) = (Ab(1780\ cm^{-1}))/(Ab(1500\ cm^{-1})) \qquad \text{Equation:}$$

Incidentally, this measurement of the imidization ratio of a polyimide precursor is applied to the measurement of the imidization ratio of an aromatic polyimide precursor. On the other hand, in the case of measurement of the imidization ratio of an aliphatic polyimide precursor, instead of the absorption peak of aromatic rings, a peak derived from a moiety that does not change before and after the imidization reaction is used as the internal standard peak.

End Amino Group of Polyimide Precursor

The polyimide precursor desirably contains a polyimide precursor (resin) having an amino group at an end. More desirably, the polyimide precursor is a polyimide precursor having amino groups at all ends.

In order to provide a polyimide precursor having an amino group at a molecular end, for example, in the polymerization reaction, the diamine compound is added such that its molar equivalent is an excess with respect to the molar equivalent of the tetracarboxylic dianhydride. The ratio of the molar equivalent of the diamine compound to the molar equivalent of the tetracarboxylic dianhydride is desirably 1.0001 or more and 1.2 or less, more desirably 1.001 or more and 1.2 or less.

When the molar equivalent ratio of the diamine compound to the tetracarboxylic dianhydride is 1.0001 or more, the resultant amino groups at molecular ends exert a strong effect of enhancing dispersibility. When the molar equivalent ratio is 1.2 or less, the resultant polyimide precursor has a high molecular weight; when this polyimide precursor is used for producing, for example, a film-shaped polyimide shaped article, this article tends to have sufficiently high film strengths (tear strength and tensile strength).

The end amino groups of the polyimide precursor are detected by subjecting the polyimide precursor composition to a reaction with trifluoroacetic anhydride (which quantitatively reacts with amino groups). In other words, the end amino groups of the polyimide precursor are amidated with trifluoroacetic acid. After this process is completed, the polyimide precursor is purified by, for example, reprecipitation to thereby remove an excess of trifluoroacetic anhydride and the residue of trifluoroacetic acid. The resultant polyimide precursor is subjected to quantification by the nuclear magnetic resonance (NMR) method, to thereby determine the amount of end amino groups of the polyimide precursor.

The polyimide precursor desirably has a number-average molecular weight of 1000 or more and 100000 or less, more desirably 5000 or more and 50000 or less, still more desirably 10000 or more and 30000 or less.

When the polyimide precursor is prepared so as to have a number-average molecular weight in such a range, a decrease in the solubility of the polyimide precursor in solvents is suppressed, which tends to result in sufficiently high film formability. In particular, when a polyimide precursor containing a resin having an amino group at an end is employed, a low molecular weight of the polyimide precursor results in a high content ratio of the end amino group and an aliphatic cyclic amine compound also present in the polyimide precursor composition tends to affect the polyimide precursor to cause a decrease in its solubility. However, by setting the number-average molecular weight of the polyimide precursor to such a range, a decrease in the solubility may be suppressed.

Incidentally, by adjusting the molar equivalent ratio of the diamine compound to the tetracarboxylic dianhydride, a polyimide precursor having a desired number-average molecular weight may be obtained.

The number-average molecular weight of the polyimide precursor is determined by gel permeation chromatography (GPC) under the following measurement conditions.
Column: TSKgel α-M (7.8 mm I.D×30 cm) manufactured by Tosoh Corporation
Eluent: DMF (dimethylformamide)/30 mM LiBr/60 mM phosphoric acid
Flow rate: 0.6 mL/min
Injection amount: 60 μL
Detector: RI (differential refractive index detector)

The content (concentration) of the polyimide precursor in the whole polyimide precursor composition is desirably 0.1 mass % or more and 40 mass % or less, more desirably 0.5 mass % or more and 25 mass % or less, still more desirably 1 mass % or more and 20 mass % or less.

Other Additives

The polyimide precursor composition may further contain, for example, various fillers for the purpose of imparting various properties such as conductivity and mechanical strength to the polyimide shaped article to be produced. The polyimide precursor composition may also contain, for example, a catalyst for promoting an imidization reaction, or a leveling agent for enhancing the formation quality of the film to be formed.

Such a conductive material added for imparting conductivity may be a conductive material (for example, having a volume resistivity of less than $10^7$ Ω·cm; the same applies to the following description) or a semiconductive material (for example, having a volume resistivity of $10^7$ Ω·cm or more and $10^{13}$ Ω·cm or less; the same applies to the following description). These materials are selected in accordance with the intended use.

Examples of the conductive agent include carbon blacks (such as acidic carbon black having a pH of 5.0 or less), metals (such as aluminum and nickel), metal oxides (such as yttrium oxide and tin oxide), ion conductive materials (such as potassium titanate and LiCl), and conductive polymers (such as polyaniline, polypyrrole, polysulfone, and polyacetylene).

These conductive materials may be used alone or in combination of two or more thereof.

When such a conductive material has the form of particles, the particles desirably have a primary particle size of less than 10 μm, more desirably 1 μm or less.

Examples of the fillers added for increasing the mechanical strength include particulate materials such as silica powder, alumina powder, barium sulfate powder, titanium oxide powder, mica, and talc. In order to improve the water repellency and releasability of the surface of the polyimide shaped article, for example, a powder of a fluororesin such as polytetrafluoroethylene (PTFE) or a tetrafluoroethylene perfluoroalkyl vinyl ether copolymer (PFA) may be added.

Examples of the catalyst for promoting an imidization reaction include dehydrating agents such as acid anhydrides, and acid catalysts such as phenol derivatives, sulfonic acid derivatives, and benzoic acid derivatives.

In order to enhance the formation quality of the film of the polyimide shaped article, a surfactant may be added. The surfactant may be selected from cationic surfactants, anionic surfactants, and nonionic surfactants.

Examples of other usable additives include well-known additives selected in accordance with the intended use of the polyimide shaped article to be produced.

The content of such another additive is selected in accordance with the intended use of the polyimide shaped article to be produced.

Method for Producing Polyimide Precursor Composition

The method for producing the above-described polyimide precursor composition is not particularly limited. The polyimide precursor composition may be simply produced by a method including polymerizing a tetracarboxylic dianhydride and a diamine compound in a solvent mixture containing a water-insoluble solvent A and an alcohol solvent B or in such a solvent mixture further containing an aprotic polar solvent C, to generate a polyimide precursor.

The reaction temperature during the polymerization reaction for the polyimide precursor is desirably, for example, 0° C. or more and 70° C. or less, more desirably 10° C. or more and 60° C. or less, still more desirably 20° C. or more and 55° C. or less. When the reaction temperature is set to 0° C. or more, the polymerization reaction is promoted, which shortens the time required for the reaction and facilitates enhancement of the productivity. On the other hand, when the reaction temperature is set to 70° C. or less, the imidization reaction proceeding in the molecules of the generated polyimide precursor is suppressed, which facilitates suppression of precipitation or gelation due to a decrease in the solubility of the polyimide precursor.

The time for the polymerization reaction for the polyimide precursor may be set in the range of 1 hour or more and 24 hours or less in accordance with the reaction temperature.

Polyimide Shaped Article

A polyimide precursor composition according to the exemplary embodiment is dried and burned to thereby obtain a polyimide shaped article.

Specifically, a coating formed of the polyimide precursor composition is first subjected to drying treatment. This drying treatment forms a dry film (a dried film to be imidized).

The drying treatment is performed under heating conditions of, for example, a temperature of 80° C. or more and 200° C. or less and a time for 10 minutes or more and 60 minutes or less. The higher the temperature, the shorter the heating time sufficient for drying. During the heating, application of hot air to the coating is also effective. During the heating, the temperature may be increased in a stepwise manner or at a constant rate.

Subsequently, the dry film is subjected to imidization treatment. As a result, a polyimide resin is synthesized.

The imidization treatment is performed under heating conditions of, for example, a temperature of 150° C. or more and 400° C. or less (desirably 200° C. or more and 300° C. or less) and a time for 20 minutes or more and 60 minutes or less, so that an imidization reaction occurs to form a polyimide resin layer. During heating for causing the reaction, heating to the final heating temperature may be performed by increasing the temperature in a stepwise manner or by gradually increasing the temperature at a constant rate.

The steps having been described so far are performed, so that a polyimide shaped article is formed. Optionally, the polyimide shaped article is released from the coated article, and subjected to a post processing.

Examples of the polyimide shaped article formed from the polyimide precursor composition according to the exemplary embodiment include various polyimide shaped articles such as liquid crystal alignment films, passivation films, electric wire coating materials, and adhesive films. Additional examples of the polyimide shaped article include flexible electronic substrate films, copper-clad laminate films, laminate films, electric insulation films, fuel-cell porous films, separation films, heat-resistant films, IC packages, resist films, planarization films, microlens array films, and optical fiber clad films.

Additional examples of the polyimide shaped article include belt members. Examples of the belt members include driving belts and belts for electrophotographic image forming apparatuses (such as intermediate transfer belts, transfer belts, fixing belts, and transport belts).

Accordingly, the method for producing a polyimide shaped article according to the exemplary embodiment is applicable to methods for producing various polyimide shaped articles described above as examples.

EXAMPLES

Hereinafter, Examples will be described; however, the present invention is not limited to these Examples at all. In the following description, "parts" and "%" are all based on mass unless otherwise specified.

Example 1

Preparation of Polyimide Precursor Composition (A-1)

A flask equipped with a stirring rod, a thermometer, and a dropping funnel is charged with, as solvents, 902.5 g of cyclohexanone (hereafter, represented as CH) and 47.5 g of ethylene glycol (hereafter, represented as EG). To this flask, as a diamine compound, 82.47 g (411.86 mmol) of diaminodiphenyl ether (hereafter, represented as ODA; molecular weight: 200.24) is added. The resultant solution is stirred at 60° C. for 30 minutes to dissolve the diamine compound.

To the resultant solution, 117.53 g (399.46 mmol) of 3,3',4,4'-biphenyltetracarboxylic dianhydride (hereafter, represented as BPDA; molecular weight: 294.22) is added. The resultant solution being maintained at a reaction temperature of 60° C. is stirred for 24 hours to cause dissolution and reaction. Thus, a polyimide precursor composition (A-1) is obtained.

Incidentally, the imidization ratio of the generated polyimide precursor is found to be 0.03. The above-described measurement of the amount of end amino groups reveals that the composition contains a polymer having an amino group at least an end.

The polyimide precursor composition is subjected to various measurements as follows.

Viscosity Measurement Method

The viscosity of the composition is measured with an E-type viscometer under the following conditions.
Measurement Instrument: E-type rotation viscometer TV-20H (Toki Sangyo Co., Ltd.)
Measurement Probe: No. 3 rotor 3°×R14
Measurement Temperature: 22° C.
Solid Content Measurement Method The solid content (concentration) of the composition is measured with a simultaneous thermogravimetric-differential thermal analyzer under the following conditions. The measured value at 380° C. is employed; the solid content is measured as the solid content ratio of polyimide.
Measurement Instrument: simultaneous thermogravimetric-differential thermal analyzer TG/DTA6200 (Seiko Instruments Inc.)
Measurement Range: 20° C. or more and 400° C. or less
Temperature Increase Rate: 20° C./min
Viscosity after Lapse of 30 Days and Time-Dependent Viscosity Change Ratio A glass container is charged with the prepared varnish sample and hermetically sealed. After the glass container is left in a 30° C. environment for 30 days, the viscosity of the varnish sample is measured (viscosity after lapse of 30 days). The change ratio of this viscosity to the initial viscosity is calculated, by the following equation, as a time-dependent viscosity change ratio.

Time-Dependent Viscosity Change Ratio (%)={(Viscosity after Lapse of 30 Days)−(Initial Viscosity)}/(Initial Viscosity)×100

Evaluation of Shaped Article

The obtained polyimide precursor composition (A-1) is used to form an endless-belt film. This film is evaluated in terms of film formability.

Film Formation Test

A silicone release agent (manufactured by Shin-Etsu Chemical Co., Ltd., trade name: KS-700) is applied to the outer surface of a stainless steel cylindrical mold having an outer diameter of 90 mm and a length of 450 mm, and dried (release-agent treatment).

While the cylindrical mold having been subjected to the release-agent treatment is rotated in the circumferential direction at 10 rpm, the polyimide precursor composition (A-1) is discharged as a coating liquid through a dispenser having an orifice size of 1.0 mm, the dispenser being moved from an end of the cylindrical mold, and the discharged composition is pressed onto the mold with a metal blade attached to the mold. Thus, the composition is applied to the mold. Specifically, a dispenser unit is moved in the axial direction of the cylindrical mold at a rate of 100 mm/min, so that the coating liquid is spirally applied to the cylindrical mold. After this application, the blade is removed and the cylindrical mold is continuously rotated for 5 minutes to level the coating.

Subsequently, the mold having the coating thereon is placed into a drying oven. The coating is dried at 100° C. in air atmosphere for 10 minutes while the mold is rotated at 10 rpm. During this drying treatment, the solvent evaporates from the coating. Thus, the coating is turned into a self-supporting polyamic acid resin shaped article (endless-belt body).

Subsequently, the resin shaped article is burned in a clean oven at 300° C. for 30 minutes to evaporate the solvent and to complete an imidization reaction.

Subsequently, after the temperature of the cylindrical mold is brought to 25° C., the resin is released from the cylindrical mold. Thus, a cylindrical polyimide shaped article is obtained.

Evaluation: Film Formability

The applied polyimide composition, the dried composition, and the resultant cylindrical polyimide shaped article are visually evaluated in terms of the following properties of formed films.

(1) Blushing of Leveling Film

While the coated cylindrical mold is rotated to level the coating film, occurrence of blushing due to, for example, precipitation of the resin of the coating film is observed and evaluated.

A: The coating has high uniformity and no blushing is observed.
B: Blushing is observed at ends of the coating.
C: Blushing is observed at ends and partially in the central portion of the coating.
D: Blushing is observed over the whole coating.

(2) Dryness of Dry Film

The dried coating film of the polyimide composition is evaluated in terms of dryness.

A: The solvent has sufficiently evaporated; the dry film itself has solidified and has no fluidity; and no dust adheres to the surface of the film.

B: Coating cissing (aggregation) is observed in less than 10% of the area of the coated surface.
C: The dry film does not flow on the cylindrical mold being tilted; however, dust adheres to the surface of the film.
D: The solvent has not sufficiently evaporated, and the dry film flows on the cylindrical mold being tilted.

(3) Drying Cissing

The dried polyimide composition is evaluated in terms of the presence or absence of drying cissing (aggregation) on the mold surface.

A: No drying cissing (aggregation) is observed on the coated surface.
B: Drying cissing (aggregation) is observed in less than 10% of the area of the coated surface.
C: Drying cissing (aggregation) is observed in 10% or more and less than 50% of the area of the coated surface.
D: Drying cissing (aggregation) is observed in 50% or more of the area of the coated surface.

(4) Void Marks

The burned cylindrical polyimide shaped article is evaluated in terms of the presence or absence of void marks on the surface.

A: No generation of void marks is observed.
B: On the surface of the shaped article, 1 or more and less than 10 void marks are observed.
C: Over the surface of the shaped article, 10 or more and less than 50 void marks are scattered.
D: Over the whole surface of the shaped article, 50 or more void marks are present.

(5) Surface Unevenness/Pattern

The burned cylindrical shaped article is evaluated in terms of the presence or absence of surface unevenness/pattern on the surface.

A: No surface unevenness/pattern is observed.
B: Surface unevenness/pattern is slightly observed on a portion of the surface of the shaped article (less than 10% of the surface area of the shaped article).
C: Surface unevenness/pattern is observed on a portion of the surface of the shaped article (10% or more of the surface area of the shaped article).
D: Surface unevenness/pattern is uniformly generated over the surface of the shaped article.

(6) Film Uniformity

The cylindrical polyimide shaped article obtained in Example is evaluated in terms of uniformity of the film. When the cylindrical polyimide shaped article has high uniformity, it is evaluated as A. When the cylindrical polyimide shaped article has low surface uniformity because of, for example, sagging on the surface of the base member or cissing due to flowing and aggregation, the shaped article is evaluated as B.

Examples 2 to 23

Polyimide precursor compositions are prepared as in Example 1 except that the synthesis conditions for the polyimide precursor composition are changed to those described in Tables 1 to 3 below.

Comparative Examples 1 to 12

Polyimide precursor compositions are prepared as in Example 1 except that the synthesis conditions for the polyimide precursor composition are changed to those described in Tables 4 and 5 below.

TABLE 1

|  |  | Example 1 | Example 2 | Example 3 | Example 4 | Example 5 | Example 6 | Example 7 | Example 8 |
|---|---|---|---|---|---|---|---|---|---|
| Tetracarboxylic dianhydride | Chemical species | BPDA | BPDA | BPDA | BPDA | BPDA | BPDA | BPDA | BPDA |
|  | Mixing amount (g) | 117.53 | 117.53 | 117.53 | 117.53 | 29.38 | 118.03 | 118.03 | 118.03 |
|  | (mmol) | 399.46 | 399.46 | 399.46 | 399.46 | 99.87 | 401.16 | 401.16 | 401.16 |
| Diamine compound | Chemical species | ODA | ODA | ODA | ODA | ODA | ODA | ODA | ODA |
|  | Mixing amount (g) | 82.47 | 82.47 | 82.47 | 82.47 | 20.62 | 81.97 | 81.97 | 81.97 |
|  | (mmol) | 411.86 | 411.86 | 411.86 | 411.86 | 102.97 | 409.36 | 409.36 | 409.36 |
| Equivalent ratio |  | 0.97 | 0.97 | 0.97 | 0.97 | 0.97 | 0.98 | 0.98 | 0.98 |
| Water-insoluble solvent A | Solvent species | CH | CH | CH | CH | CH | CH | CH | CH |
|  | Boiling point (° C.) | 155.6 | 155.6 | 155.6 | 155.6 | 155.6 | 155.6 | 155.6 | 155.6 |
|  | Mixing amount (g) | 902.5 | 720 | 640 | 560 | 451.3 | 654.55 | 600 | 553.85 |
| Alcohol solvent B | Solvent species | EG | EG | EG | EG | EG | EG | EG | EG |
|  | Mixing amount (g) | 47.5 | 80 | 160 | 240 | 451.3 | 72.73 | 66.67 | 61.54 |
| Aprotic polar solvent C | Solvent species | — | — | — | — | — | NMP | NMP | NMP |
|  | Mixing amount (g) | 0 | 0 | 0 | 0 | 0 | 72.73 | 133.33 | 184.62 |
| Concentration (%) |  | 5 | 20 | 20 | 20 | 20 | 20 | 20 | 20 |
| Mass ratio [A/B] |  | 95/5 | 90/10 | 80/20 | 70/30 | 50/50 | 90/10 | 90/10 | 90/10 |
| Mass ratio [A + B/C] |  | 100/0 | 100/0 | 100/0 | 100/0 | 100/0 | 100/10 | 100/20 | 100/30 |
| State of composition |  | Dissolved | Dissolved | Dissolved | Dissolved | Dissolved | Dissolved | Dissolved | Dissolved |
| Viscosity (Pas) |  | 1 | 6 | 5 | 8 | 1 | 60 | 50 | 80 |
| Viscosity after lapse of 30 days at room temperature (Pas) |  | 1 | 6 | 5 | 8 | 1.5 | 60 | 50 | 80 |
| Time-dependent viscosity change ratio (%) |  | 0.00 | 0.00 | 0.00 | 0.00 | 50.00 | 0.00 | 0.00 | 0.00 |
| Number-average molecular weight (×10$^3$) |  | 15 | 30 | 30 | 30 | 15 | 50 | 50 | 50 |
| Imidization ratio |  | 0.03 | 0.03 | 0.03 | 0.04 | 0.04 | 0.03 | 0.03 | 0.04 |

TABLE 2

|  |  | Example 9 | Example 10 | Example 11 | Example 12 | Example 13 | Example 14 | Example 15 | Example 16 |
|---|---|---|---|---|---|---|---|---|---|
| Tetracarboxylic dianhydride | Chemical species | BPDA | BPDA | BPDA | BPDA | BPDA | BPDA | BPDA | BPDA |
|  | Mixing amount (g) | 118.03 | 118.03 | 118.03 | 118.03 | 117.53 | 117.53 | 117.53 | 117.53 |
|  | (mmol) | 401.16 | 401.16 | 401.16 | 401.16 | 399.46 | 399.46 | 399.46 | 399.46 |

TABLE 2-continued

|  |  | Example 9 | Example 10 | Example 11 | Example 12 | Example 13 | Example 14 | Example 15 | Example 16 |
|---|---|---|---|---|---|---|---|---|---|
| Diamine compound | Chemical species | ODA | ODA | ODA | ODA | ODA | ODA | ODA | ODA |
|  | Mixing amount (g) | 81.97 | 81.97 | 81.97 | 81.97 | 82.47 | 82.47 | 82.47 | 82.47 |
|  | (mmol) | 409.36 | 409.36 | 409.36 | 409.36 | 411.86 | 411.86 | 411.86 | 411.86 |
|  | Equivalent ratio | 0.98 | 0.98 | 0.98 | 0.98 | 0.97 | 0.97 | 0.97 | 0.97 |
| Water-insoluble solvent A | Solvent species | CH | CH | CH | CH | IP | IP | MTHF | MTHF |
|  | Boiling point (° C.) | 155.6 | 155.6 | 155.6 | 155.6 | 215.2 | 215.2 | 80.3 | 80.3 |
|  | Mixing amount (g) | 480 | 426.67 | 373.33 | 266.67 | 720 | 600 | 720 | 600 |
| Alcohol solvent B | Solvent species | EG | EG | EG | EG | nPrA | nPrA | IPA | IPA |
|  | Mixing amount (g) | 53.33 | 106.67 | 160 | 266.67 | 80 | 66.67 | 80 | 66.67 |
| Aprotic polar solvent C | Solvent species | NMP | NMP | NMP | NMP | — | DMI | — | BL |
|  | Mixing amount (g) | 266.67 | 266.67 | 266.67 | 266.67 | 0 | 133.33 | 0 | 133.33 |
| Concentration (%) |  | 20 | 20 | 20 | 20 | 20 | 20 | 20 | 20 |
| Mass ratio [A/B] |  | 90/10 | 80/20 | 70/30 | 50/50 | 90/10 | 90/10 | 90/10 | 90/10 |
| Mass ratio [A + B/C] |  | 100/50 | 100/50 | 100/50 | 100/50 | 100/0 | 100/20 | 100/0 | 100/20 |
| State of composition |  | Dissolved | Dissolved | Dissolved | Dissolved | Dissolved | Dissolved | Dissolved | Dissolved |
| Viscosity (Pas) |  | 6 | 5 | 8 | 6 | 5 | 8 | 60 | 50 |
| Viscosity after lapse of 30 days at room temperature (Pas) |  | 6 | 5 | 8 | 6 | 5 | 8 | 60 | 50 |
| Time-dependent viscosity change ratio (%) |  | 0.00 | 0.00 | 0.00 | 0.00 | 0.00 | 0.00 | 0.00 | 0.00 |
| Number-average molecular weight (×10$^3$) |  | 70 | 70 | 70 | 30 | 30 | 30 | 50 | 50 |
| Imidization ratio |  | 0.03 | 0.03 | 0.04 | 0.03 | 0.03 | 0.04 | 0.03 | 0.03 |

TABLE 3

|  |  | Example 17 | Example 18 | Example 19 | Example 20 | Example 21 | Example 22 | Example 23 |
|---|---|---|---|---|---|---|---|---|
| Tetracarboxylic dianhydride | Chemical species | BPDA | PMDA | BPDA | BPDA | BPDA | BPDA | BPDA |
|  | Mixing amount (g) | 145.04 | 82.20 | 113.88 | 116.52 | 118.52 | 119.01 | 120.43 |
|  | (mmol) | 492.96 | 376.86 | 387.07 | 396.04 | 402.84 | 404.48 | 409.32 |
| Diamine compound | Chemical species | PDA | ODA | ODA | ODA | ODA | ODA | ODA |
|  | Mixing amount (g) | 54.96 | 77.80 | 86.22 | 83.48 | 81.48 | 80.99 | 79.57 |
|  | (mmol) | 508.23 | 388.53 | 430.59 | 416.88 | 406.9 | 404.48 | 397.39 |
|  | Equivalent ratio | 0.97 | 0.97 | 0.9 | 0.95 | 0.99 | 1 | 1.03 |
| Water-insoluble solvent A | Solvent species | CH | CH | CH | CH | CH | CH | CH |
|  | Boiling point (° C.) | 155.6 | 155.6 | 155.6 | 155.6 | 155.6 | 155.6 | 155.6 |
|  | Mixing amount (g) | 720 | 720 | 720 | 720 | 720 | 720 | 720 |
| Alcohol solvent B | Solvent species | EG | EG | EG | EG | EG | EG | EG |
|  | Mixing amount (g) | 80 | 80 | 80 | 80 | 80 | 80 | 80 |
| Aprotic polar solvent C | Solvent species | — | — | — | — | — | — | — |
|  | Mixing amount (g) | 0 | 0 | 0 | 0 | 0 | 0 | 0 |
| Concentration (%) |  | 20 | 20 | 20 | 20 | 20 | 20 | 20 |
| Mass ratio [A/B] |  | 90/10 | 90/10 | 90/10 | 90/10 | 90/10 | 90/10 | 90/10 |
| Mass ratio [A + B/C] |  | 100/0 | 100/0 | 100/0 | 100/0 | 100/0 | 100/0 | 100/0 |
| State of composition |  | Dissolved | Dissolved | Dissolved | Dissolved | Dissolved | Dissolved | Dissolved |
| Viscosity (Pas) |  | 9 | 3 | 0.5 | 3 | 180 | 200 | 7 |
| Viscosity after lapse of 30 days at room temperature (Pas) |  | 9 | 3 | 0.5 | 3 | 190 | 220 | 4 |
| Time-dependent viscosity change ratio (%) |  | 0.00 | 0.00 | 0.00 | 0.00 | 5.56 | 10.00 | −42.86 |
| Number-average molecular weight (×10$^3$) |  | 32 | 20 | 3 | 10 | 50 | 100 | 30 |
| Imidization ratio |  | 0.03 | 0.03 | 0.03 | 0.03 | 0.03 | 0.03 | 0.03 |

TABLE 4

|  |  | Comparative Example 1 | Comparative Example 2 | Comparative Example 3 | Comparative Example 4 | Comparative Example 5 | Comparative Example 6 |
|---|---|---|---|---|---|---|---|
| Tetracarboxylic dianhydride | Chemical species | BPDA | BPDA | BPDA | BPDA | BPDA | BPDA |
|  | Mixing amount (g) | 117.53 | 117.53 | 117.53 | 117.53 | 117.53 | 117.53 |
|  | (mmol) | 399.46 | 399.46 | 399.46 | 399.46 | 399.46 | 399.46 |
| Diamine compound | Chemical species | ODA | ODA | ODA | ODA | ODA | ODA |
|  | Mixing amount (g) | 82.47 | 82.47 | 82.47 | 82.47 | 82.47 | 82.47 |
|  | (mmol) | 411.86 | 411.86 | 411.86 | 411.86 | 411.86 | 411.86 |
|  | Equivalent ratio | 0.97 | 0.97 | 0.97 | 0.97 | 0.97 | 0.97 |
| Ketone or ether solvent A' | Solvent species | — | — | — | CH | IP | MTHF |
|  | Boiling point (° C.) | — | — | — | 155.6 | 215.2 | 80.3 |
|  | Mixing amount (g) | — | — | — | 800 | 800 | 800 |

TABLE 4-continued

|  |  | Comparative Example 1 | Comparative Example 2 | Comparative Example 3 | Comparative Example 4 | Comparative Example 5 | Comparative Example 6 |
|---|---|---|---|---|---|---|---|
| Alcohol or aqueous solvent B' | Solvent species | — | — | — | — | — | — |
|  | Mixing amount (g) | — | — | — | — | — | — |
| Aprotic polar solvent C | Solvent species | NMP | DMI | BL | — | — | — |
|  | Mixing amount (g) | 800 | 800 | 800 | — | — | — |
| Concentration (%) |  | 20 | 20 | 20 | 20 | 20 | 20 |
| Mass ratio [A'/B'] |  | 0/0 | 0/0 | 0/0 | 100/0 | 100/0 | 100/0 |
| Mass ratio [A' + B'/C] |  | 0/100 | 0/100 | 0/100 | 100/0 | 100/0 | 100/0 |
| State of composition |  | Dissolved | Dissolved | Dissolved | Undissolved | Undissolved | Undissolved |
| Viscosity (Pas) |  | 7 | 8 | 7 | — | — | — |
| Viscosity after lapse of 30 days at room temperature (Pas) |  | 6 | 5 | 4 | — | — | — |
| Time-dependent viscosity change ratio (%) |  | −14 | −38 | −43 | — | — | — |
| Number-average molecular weight (×10³) |  | 50 | 50 | 50 | — | — | — |
| Imidization ratio |  | 0.05 | 0.05 | 0.05 | — | — | — |

TABLE 5

|  |  | Comparative Example 7 | Comparative Example 8 | Comparative Example 9 | Comparative Example 10 | Comparative Example 11 | Comparative Example 12 |
|---|---|---|---|---|---|---|---|
| Tetracarboxylic dianhydride | Chemical species | BPDA | BPDA | BPDA | BPDA | BPDA | BPDA |
|  | Mixing amount (g) | 117.53 | 117.53 | 117.53 | 117.53 | 117.53 | 117.53 |
|  | (mmol) | 399.46 | 399.46 | 399.46 | 399.46 | 399.46 | 399.46 |
| Diamine compound | Chemical species | ODA | ODA | ODA | ODA | ODA | ODA |
|  | Mixing amount (g) | 82.47 | 82.47 | 82.47 | 82.47 | 82.47 | 82.47 |
|  | (mmol) | 411.86 | 411.86 | 411.86 | 411.86 | 411.86 | 411.86 |
| Equivalent ratio |  | 0.97 | 0.97 | 0.97 | 0.97 | 0.97 | 0.97 |
| Ketone or ether solvent A' | Solvent species | — | (THF) | — | — | (THF) | (THF) |
|  | Boiling point (° C.) | — | 66 | — | — | 66 | 66 |
|  | Mixing amount (g) | — | 800 | — | — | 720 | 720 |
| Alcohol or aqueous solvent B' | Solvent species | EG | — | (Water) | (MeOH) | (Water) | (MeOH) |
|  | Mixing amount (g) | 800 | — | 800 | 800 | 80 | 80 |
| Aprotic polar solvent C | Solvent species | — | — | — | — | — | — |
|  | Mixing amount (g) | — | — | — | — | — | — |
| Concentration (%) |  | 20 | 20 | 20 | 20 | 20 | 20 |
| Mass ratio [A'/B'] |  | 0/100 | 100/0 | 0/100 | 0/100 | 90/10 | 90/10 |
| Mass ratio [A' + B'/C] |  | 100/0 | 100/0 | 100/0 | 100/0 | 100/0 | 100/0 |
| State of composition |  | Undissolved | Undissolved | Undissolved | Undissolved | Dissolved | Dissolved |
| Viscosity (Pas) |  | — | — | — | — | 7 | 7 |
| Viscosity after lapse of 30 days at room temperature (Pas) |  | — | — | — | — | 4 | 4 |
| Time-dependent viscosity change ratio (%) |  | — | — | — | — | −42.86 | −42.86 |
| Number-average molecular weight (×10³) |  | — | — | — | — | 50 | 50 |
| Imidization ratio |  | — | — | — | — | 0.05 | 0.05 |

TABLE 6

|  | Example 1 | Example 2 | Example 3 | Example 4 | Example 5 | Example 6 | Example 7 | Example 8 |
|---|---|---|---|---|---|---|---|---|
| (1) Blushing of leveling film | Not tested | A | A | A | Not tested | A | A | A |
| (2) Dryness of dry film | Not tested | A | A | A | Not tested | A | A | A |
| (3) Drying cissing | Not tested | A | A | A | Not tested | A | A | A |
| (4) Void marks | Not tested | B | B | B | Not tested | A | A | A |
| (5) Surface unevenness/pattern | Not tested | A | A | A | Not tested | A | A | A |
| (6) Film uniformity | Not tested | A | A | A | Not tested | A | A | A |

TABLE 7

|  | Example 9 | Example 10 | Example 11 | Example 12 | Example 13 | Example 14 | Example 15 | Example 16 |
|---|---|---|---|---|---|---|---|---|
| (1) Blushing of leveling film | A | A | A | A | A | A | A | A |
| (2) Dryness of dry film | A | A | A | A | A | A | A | A |
| (3) Drying cissing | A | A | A | A | A | A | A | A |
| (4) Void marks | A | A | A | A | B | A | B | A |

TABLE 7-continued

|  | Example 9 | Example 10 | Example 11 | Example 12 | Example 13 | Example 14 | Example 15 | Example 16 |
|---|---|---|---|---|---|---|---|---|
| (5) Surface unevenness/pattern | A | A | A | A | B | A | B | A |
| (6) Film uniformity | A | A | A | A | A | A | A | A |

TABLE 8

|  | Example 17 | Example 18 | Example 19 | Example 20 | Example 21 | Example 22 | Example 23 |
|---|---|---|---|---|---|---|---|
| (1) Blushing of leveling film | A | A | A | A | A | A | A |
| (2) Dryness of dry film | A | A | A | A | A | A | A |
| (3) Drying cissing | A | A | A | A | A | A | A |
| (4) Void marks | B | B | B | B | B | B | B |
| (5) Surface unevenness/pattern | A | A | A | A | A | A | A |
| (6) Film uniformity | A | A | A | A | A | A | A |

TABLE 9

|  | Comparative Example 1 | Comparative Example 2 | Comparative Example 3 | Comparative Example 4 | Comparative Example 5 | Comparative Example 6 |
|---|---|---|---|---|---|---|
| (1) Blushing of leveling film | A | A | B | — | — | — |
| (2) Dryness of dry film | D | D | D | — | — | — |
| (3) Drying cissing | B | B | B | — | — | — |
| (4) Void marks | B | B | B | — | — | — |
| (5) Surface unevenness/pattern | B | B | B | — | — | — |

TABLE 10

|  | Comparative Example 7 | Comparative Example 8 | Comparative Example 9 | Comparative Example 10 | Comparative Example 11 | Comparative Example 12 |
|---|---|---|---|---|---|---|
| (1) Blushing of leveling film | — | — | — | — | D | D |
| (2) Dryness of dry film | — | — | — | — | A | A |
| (3) Drying cissing | — | — | — | — | B | B |
| (4) Void marks | — | — | — | — | D | D |
| (5) Surface unevenness/pattern | — | — | — | — | D | D |

The above-described results indicate that, in contrast to Comparative Examples, Examples gain good results in terms of film formability and stability of polyimide precursor compositions, and occurrence of surface unevenness is suppressed.

Incidentally, the abbreviations in Tables 1 to 5 are as follows.

"-" means "not added" or "not performed".

"Imidization ratio" is the value of "(2n+m)/(2l+2m+2n)" regarding the general formulae (I-1) to (I-3).

"Equivalent ratio" is the molar ratio of the tetracarboxylic dianhydride to the diamine compound in a polyimide precursor.

Tetracarboxylic dianhydride: BPDA (3,3',4,4'-biphenyltetracarboxylic dianhydride, molecular weight: 294.22), PMDA (pyromellitic dianhydride, molecular weight: 218.12)

Diamine compound: ODA (diaminodiphenyl ether, molecular weight: 200.24), PDA (p-phenylenediamine, molecular weight: 108.14)

Water-insoluble solvent A: CH (cyclohexanone), IP (isophorone), MTHF (methyltetrahydrofuran)

Alcohol solvent B: EG (ethylene glycol), nPrA (n-propylalcohol), IPA (isopropyl alcohol)

Aprotic polar solvent C: NMP (N-methyl-2-pyrrolidone), DMI (1,3-dimethyl-2-imidazolidinone), BL (γ-butyrolactone)

Ketone or ether solvent A': THF (tetrahydrofuran)

Alcohol or aqueous solvent B': MeOH (methanol)

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide precursor composition comprising:
a solvent mixture containing an alcohol solvent, an aprotic polar solvent, and a water-insoluble solvent that is at least one selected from the solvent group consisting of water-insoluble ketones and water-insoluble ethers; and a polyimide precursor dissolved in the solvent mixture, wherein:

a mass ratio of a total content of the water-insoluble solvent and the alcohol solvent to a content of the aprotic polar solvent is about 10:1 to about 2:1, a content of the polyimide precursor in the polyimide precursor composition is from 0.5 to 25 mass %, and the polyimide precursor is a polycondensate of:

a tetracarboxylic dianhydride selected from the group consisting of pyromellitic dianhydride, 3,3',4,4'-biphenyltetracarboxylic dianhydride, and 3,3',4,4'-benzophenonetetracarboxylic dianhydride, and a diamine compound selected from the group consisting of p-phenylenediamine, m-phenylenediamine, 4,4'-diaminodiphenylmethane, 4,4'-diaminodiphenyl ether, 3,4'-diaminodiphenyl ether, 4,4'-diaminodiphenylsulfide, and 4,4'-diaminodiphenylsulfone.

2. The polyimide precursor composition according to claim 1, wherein a mass ratio of a content of the water-insoluble solvent to a content of the alcohol solvent is about 19:1 to about 1:1.

3. The polyimide precursor composition according to claim 1, wherein the water-insoluble solvent contains at least one selected from the group consisting of cyclohexanone, isophorone, and methyltetrahydrofuran.

4. The polyimide precursor composition according to claim 1, wherein the alcohol solvent contains at least one selected from the group consisting of isopropyl alcohol, n-propanol, and ethylene glycol.

5. The polyimide precursor composition according to claim 1, wherein the aprotic polar solvent is at least one selected from the group consisting of N-methyl-2-pyrrolidone, 1,3-dimethyl-2-imidazolidinone, 3-methoxy-N,N-dimethylpropanamide, 3-methoxy-N,N-dibutylpropanamide, and γ-butyrolactone.

6. A method for producing a polyimide precursor composition, the method comprising subjecting a tetracarboxylic dianhydride and a diamine compound to polycondensation in a solvent mixture containing an alcohol solvent, an aprotic polar solvent, and a water-insoluble solvent that is at least one selected from the solvent group consisting of water-insoluble ketones and water-insoluble ethers, wherein:

the tetracarboxylic dianhydride is selected from the group consisting of pyromellitic dianhydride, 3,3',4,4'-biphenyltetracarboxylic dianhydride, and 3,3',4,4'-benzophenonetetracarboxylic dianhydride, the diamine compound is selected from the group consisting of p-phenylenediamine, m-phenylenediamine, 4,4'-diaminodiphenylmethane, 4,4'-diaminodiphenyl ether, 3,4'-diaminodiphenyl ether, 4,4'-diaminodiphenylsulfide, and 4,4'-diaminodiphenylsulfone, a mass ratio of a total content of the water-insoluble solvent and the alcohol solvent to a content of the aprotic polar solvent is about 10:1 to about 2:1, and a content of the polyimide precursor in the polyimide precursor composition is from 0.5 to 25 mass %.

7. The polyimide precursor composition according to claim 1, wherein the polyimide precursor contains a polyimide precursor having an amino group at an end of a main chain of a molecular chain.

8. The method according to claim 6, wherein a molar equivalent of the diamine compound is larger than a molar equivalent of the tetracarboxylic dianhydride.

* * * * *